United States Patent [19]
Hayashi et al.

[11] Patent Number: 5,610,886
[45] Date of Patent: Mar. 11, 1997

[54] FOCUS BALANCE AUTOMATIC ADJUSTING DEVICE AND AUTOMATIC ADJUSTING METHOD

[75] Inventors: Yasuhiro Hayashi, Yokohama; Hiroshi Shimada, Tokyo, both of Japan

[73] Assignee: Kabushiki Kaisha Toshiba, Kawasaki, Japan

[21] Appl. No.: 579,035

[22] Filed: Dec. 19, 1995

Related U.S. Application Data

[63] Continuation of Ser. No. 196,384, Feb. 15, 1994, abandoned.

[30] Foreign Application Priority Data

Feb. 15, 1993 [JP] Japan ................................. 5-047119

[51] Int. Cl.$^6$ ................................................... G11B 7/095
[52] U.S. Cl. ............................ 369/44.29; 369/44.32; 369/44.35; 369/54
[58] Field of Search ........................... 369/44.35, 44.36, 369/44.29, 44.27, 44.34, 54, 44.25, 44.41, 44.32; 250/201.5

[56] References Cited

U.S. PATENT DOCUMENTS

| | | | |
|---|---|---|---|
| 4,707,648 | 11/1987 | Minami | 369/44.35 |
| 4,862,446 | 8/1989 | Maeda | 369/112 |
| 5,005,163 | 4/1991 | Yamamoto et al. | 369/44.36 |
| 5,065,386 | 11/1991 | Takeya et al. | 369/44.35 |
| 5,109,367 | 4/1992 | Yoshikawa | 369/44.36 X |
| 5,146,443 | 9/1992 | Iwase et al. | 369/44.36 X |
| 5,363,357 | 11/1994 | Niwayama | 369/44.35 X |

FOREIGN PATENT DOCUMENTS

| | | |
|---|---|---|
| 0478367 | 4/1992 | European Pat. Off. . |
| 2-118923 | 5/1990 | Japan . |
| 3-3121 | 1/1991 | Japan . |

OTHER PUBLICATIONS

Patent Abstracts of Japan, vol. 14, No. 341 (P–1081), Jul. 24, 1990, JP–A–2118923.

*Primary Examiner*—Thang V. Tran
*Attorney, Agent, or Firm*—Oblon, Spivak, McClelland, Maier & Neustadt, P.C.

[57] ABSTRACT

A focus balance automatic adjusting device includes an adder, an envelop detector circuit, a disturbance generator and signal processing section. The adder adds together signals obtained by converting signal currents detected by a four-divided detector into voltages by use of first and second current-voltage converters to create an RF signal. The an envelop detector circuit effects the peak detection and bottom detection for the RF signal and creates an RFRP signal which is a difference between the peak detection signal and the bottom detection signal. The disturbance generator generates disturbance signals for deviating the focus position in positive and negative directions. The signal processing section receives the RFRP signal and the disturbance signal to control the gain of the second current-voltage converter. The focus balance is automatically adjusted by introducing a disturbance signal output from the disturbance generator into a focus servo loop, de-focusing the focus position in two opposite directions by a preset amount, and setting levels of the RFRP signal having amplitude information obtained at this time equal to each other.

26 Claims, 9 Drawing Sheets

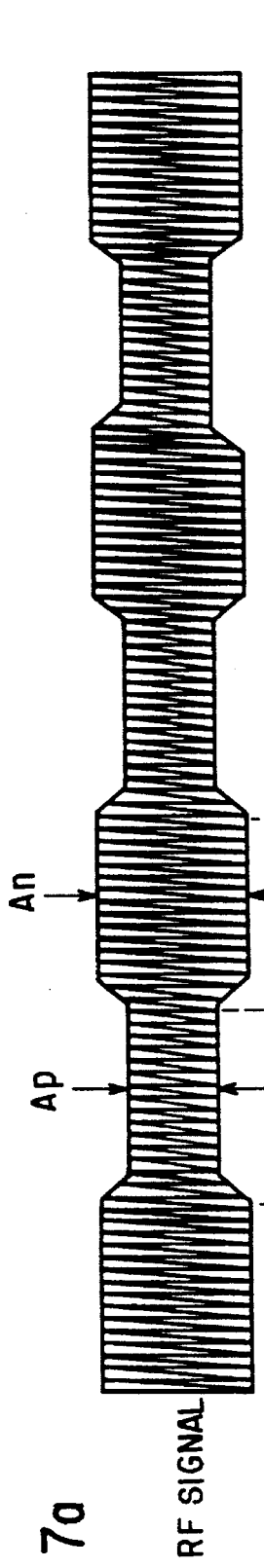
FIG. 7a RF SIGNAL
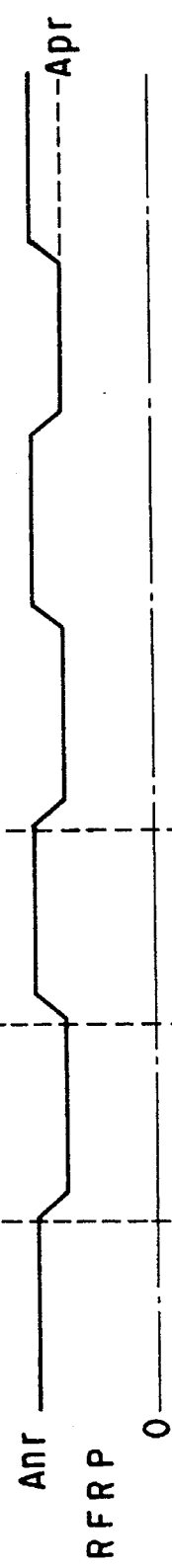
FIG. 7b Anr RFRP
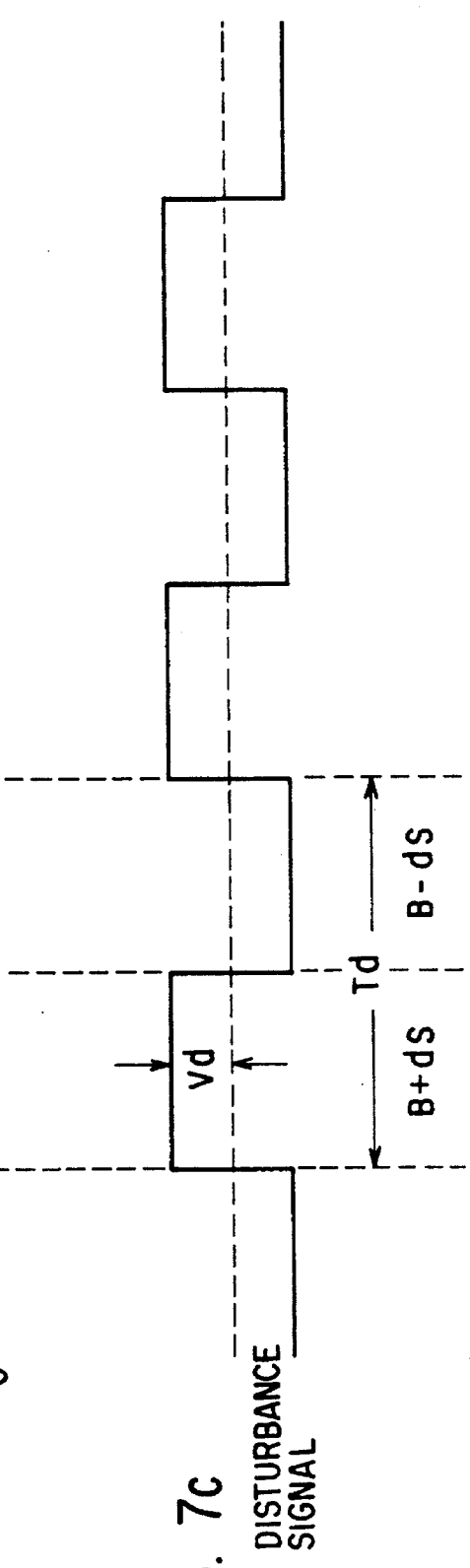
FIG. 7c DISTURBANCE SIGNAL

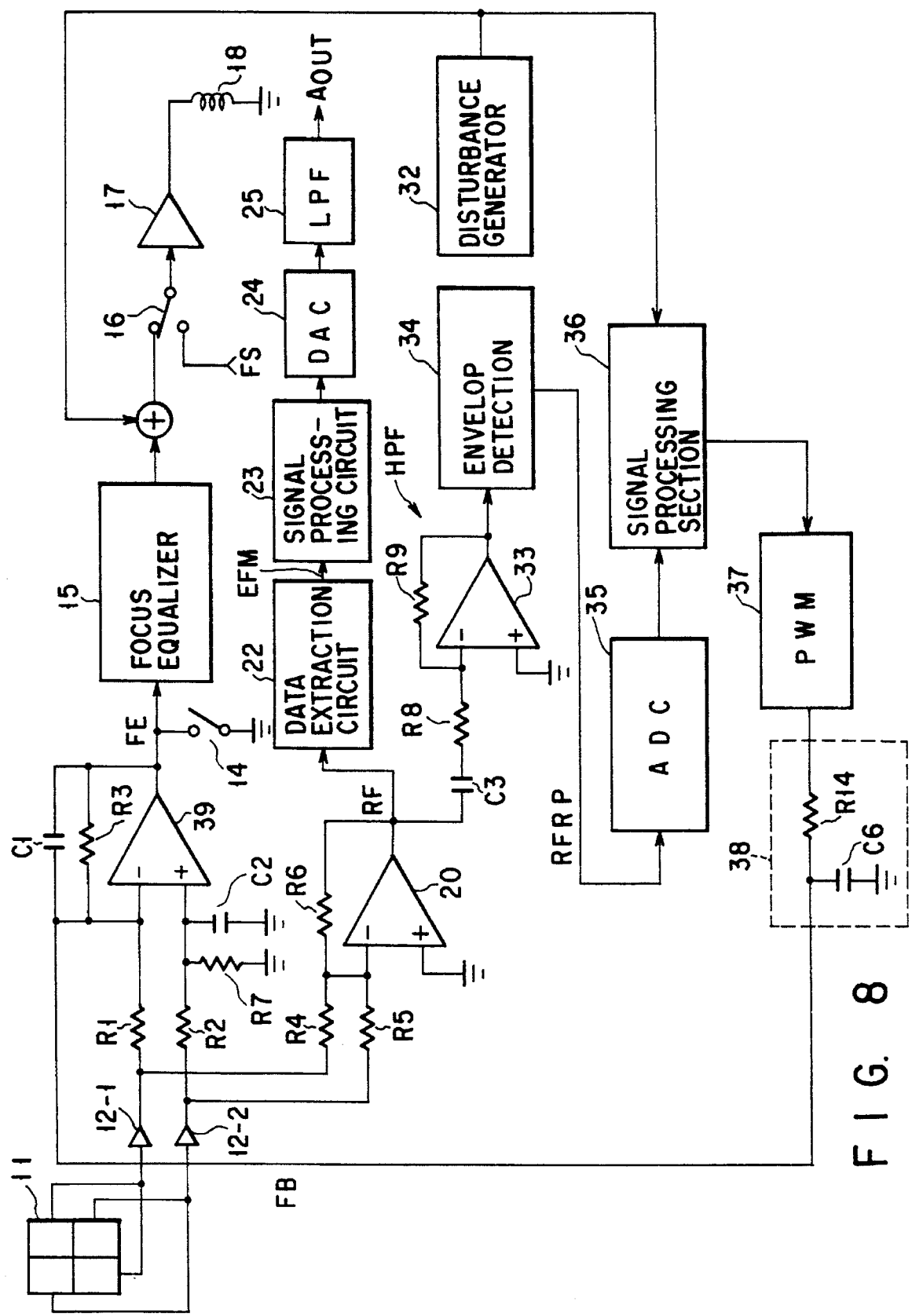
F I G. 8

FOCUS BALANCE AUTOMATIC ADJUSTING DEVICE AND AUTOMATIC ADJUSTING METHOD

This application is a Continuation of application Ser. No. 08/196,384, filed on Feb. 15, 1994, now abandoned.

BACKGROUND OF THE INVENTION

1. Field of the Invention

This invention relates to a disk reproducing device such as a CD (compact disk) player for optically reading information stored on a disk, and more particularly to a focus balance automatic adjusting device and automatic adjusting method for adjusting the focus balance by controlling a focus servo.

2. Description of the Related Art

In order to effect the recording/reproducing operation with high density and high fidelity, a digital storage/reproduction system for converting an audio signal into a digital signal by the PCM (Pulse Code Modulation) technique, storing the signal on a recording medium such as a disk or magnetic tape and reproducing the signal is used. Particularly, a CD player for creating a bit (or pit) string corresponding to digital data on a disk with a diameter of 12 cm and optically reading the bit string is now most widely used. With such a disk reproduction device, recorded data is read by moving an optical pickup unit having a semiconductor laser, photoelectric converting element or the like disposed therein in a direction from the inner periphery to the outer periphery of the disk by the linear tracking and rotating the disk with the constant linear velocity (CLV). When a semiconductor laser is used as the pickup element, a laser beam is applied from the pickup element to the track on the disk to detect the presence or absence of a pit based on the intensity of the reflected light and recorded digital data is reproduced based on the result of detection.

In order to always create the smallest spot by the laser beam on the track of the disk on which data is recorded, it is necessary for the pickup element to follow the fluctuation of the focus position caused by a variation in the thickness of the disk, the warping thereof and the like. As the error detection method of the focus servo to serve the above purpose, a large number of methods such as an astigmatism method, knife-edge method, wedge prism method and critical angle method are known. Among the above methods, the astigmatism method is most often used. In the astigmatism method, a plane-parallel plate or cylindrical lens is disposed in a return path of the laser beam or focusing light path of the reflected beam to intentionally cause a large astigmatism, detect an elliptical beam form before and after the circle of least confusion (circular beam form) and derive a focus error signal. If a detector is disposed in the position of the circle of least confusion with the disk set in the focused position, the light amount distribution on the detector is changed into an elliptical form in the out-of-focus position. Therefore, a focus error signal can be obtained by adding the detection signals on portions of the respective diagonal lines of the four-divided detector and deriving the difference therebetween. This method has an advantage that the optical system can be made small and the detection sensitivity can be made high.

Next, the focus balance adjusting circuit of the focus servo for the optical system of the conventional disk reproducing device using the astigmatism method is explained in detail with reference to FIGS. 1 and 2.

In the circuits shown in FIGS. 1 and 2, the above-described four-divided detector is used. A four-divided detector 11 constructed by a photodiode, for example, is designed to permit signals (currents) to be derived from four divided portions. The signal currents on portions lying on the respective diagonal lines are added together and the results of addition are respectively supplied to current-voltage converters 12-1 and 12-2 and respectively supplied to an inverting input terminal (−) and non-inverting input terminal (+) of a differential amplifier 13 via resistors R1 and R2. A difference between the two signals output from the detector 11 is derived by the differential amplifier 13. A parallel circuit of a resistor R3 and a capacitor C1 is connected between the inverting input terminal (−) and an output terminal of the differential amplifier 13. Further, a capacitor C2 and a semi-fixed resistor (volume) 19 is connected between the non-inverting input terminal (+) of the differential amplifier 13 and a ground terminal. An output of the differential amplifier 13 is supplied to a focus equalizer 15 as a focus error signal FE and the gain and phase thereof are compensated for by the equalizer 15. Whether the focus error signal FE is supplied to the equalizer 15 or not is controlled by use of a loop ON/OFF switch 14. When the switch 14 is set in the OFF state, the focus error signal FE is supplied to the equalizer 15, and when the switch 14 is set in the ON state, the potential of the input terminal of the equalizer 15 is set to the ground potential. An output signal of the focus equalizer 15 is supplied to a selection switch 16. The selection switch 16 is switched to select the output signal of the equalizer 15 or a focus search signal FS and supplies a selected signal to a driver 17. Then, a focus actuator 18 is driven by the driver 17.

Output signals of the current-voltage converters 12-1 and 12-2 are supplied to an inverting input terminal (−) of a differential amplifier 20 via resistors R4 and R5, respectively. A resistor R6 is connected between the inverting input terminal (−) and an output terminal of the differential amplifier 20 and the non-inverting input terminal (+) thereof is connected to the ground terminal with this connection, the differential amplifier 20 acts as an adder. A total sum signal of the four-divided detector 11 is derived by the adder, and as a result, an RF (radio frequency band) signal (which is also called as a HF signal) which is information data is created.

The RF signal is binary coded by a data extraction circuit 22 and supplied to a signal processing circuit 23 as an EFM (eight to fourteen modulation) signal. In the signal processing circuit 23, the EFM demodulation, sub-code demodulation, error correction processing and the like are effected and the results of the processings are supplied to a digital/analog converter (DAC) 24 as data DA. An output of the DAC 24 is supplied to a low-pass filter (LPF) 25 and the high frequency component thereof is cut off. Then, an output of the LPF 25 is output as a reproduced audio signal $A_{OUT}$.

In the focus balance adjusting circuit shown in FIG. 1, the focus balance adjusting operation is effected by use of the semi-fixed resistor (volume) 19. That is, the focus balance is adjusted by connecting the semi-fixed resistor 19 to one of the signal paths via which two signals obtained by adding outputs of portions on the respective diagonal lines of the four-divided detector 11 are supplied to the differential amplifier 13 and changing the gain of the differential amplifier 13. Generally, a target to be adjusted is not determined and varies depending on the type of the pickup and the error detection method. Since the performances of recent pickups are made stable, a method for setting the target to the jitter minimum point of the RF signal and amplitude maximum point may be often used. Further, the RF signal is subjected to the EFM, but a method for extracting only the signal component called 3T which most frequently occurs in the signal components of the RF signal by use of a band pass filter or the like and adjusting the extracted signal level to the maximum point can be used. Since the performance of an optical pickup head of a CD player or the like is stable, the focus balance adjustment can be effected by setting the adjusted point to a point at which the amplitude of the RF signal becomes maximum.

FIG. 2 shows another focus balance adjusting circuit of the focus servo in the conventional disk reproduction device using the astigmatism. The circuit shown in FIG. 2 is different from the circuit of FIG. 1 in that an offset adding section formed of a semi-fixed resistor 21A and a resistor 21B is connected to the inverting input terminal (−) of the differential amplifier 13. The circuit of FIG. 1 is based on a system for adjusting the gain of one of the differential inputs, and FIG. 2 is based on a adjusting system by offset addition. The other circuit construction is substantially the same as the circuit of FIG. 1 simply by replacing the semi-fixed resistor 19 by the resistor R7. However, in either case, it is always necessary to adjust the focus position at the time of focus servo operation in the manufacturing process.

As described above, the balance adjustment in the conventional focus servo system is effected by adjusting the gain of an amplifier (differential amplifier 13) for creating a focus error signal FE to control the degree of out-of-focus caused by variations in the detectors 11 and variations in the optical parts or controlling the offset amount applied to the focus servo system. That is, the focused position is adjusted by controlling the focus servo loop. The adjustment of the focused position is effected by reproducing a reference disk or the like on the manufacturing line at the time of mass production of sets and adjusting the semi-fixed resistor (volume) 19 or 21A.

However, in recent years, the effect obtained only by the above volume adjustment is not satisfactory from the viewpoint of the enhancement of the playability, omission of the adjustment of the set and maintenance of the performance against deterioration with time which are required for the disk reproduction device. Further, the focus balance adjustment has not been practiced since the automatic operation thereof is difficult from the viewpoint of the performance of the pickup. Therefore, the adjustment was effected by a robot or a person by reproducing a reference disk on the manufacturing line at the time of mass production of sets. As a result, the condition of the adjustment is limited to the condition set at a specified time and it is impossible to adjust a slight deviation of the adjustment point during the operation caused by deterioration of the constant of the parts and the pickup element and variation in the temperature environment.

As the conventional focus balance automatic adjusting device, devices disclosed in Japanese Patent Disclosures (KOKAI) No. H.2-118923 and H.3-3121 are known. The former device uses a detector for an amplitude of the RF signal sensitive to the de-focus to adjust the conversion gain of the first-stage differential amplifier. However, in general, since the de-focus characteristic displays a parabolic characteristic, a problem that the direction in which the differential gain should be changed cannot be determined at the starting time of the adjusting process occurs. Therefore, it becomes necessary to change the differential gain in one direction, detect a variation in the state caused at this time and determine the direction in which the feedback must be effected. As a result, the adjustment becomes complicated.

In the latter device, a process of monitoring the de-focus state at a plurality of points, detecting two points at which the amplitude levels of the VFO are always equal to each other, causing the controller to fetch the value obtained at this time and deriving an offset at the intermediate point between the two points based on the above information becomes necessary. That is, in the technique disclosed in the above document, it is necessary to detect the position which is de-focused at least once with a relatively high resolution even when the initial state is temporarily set extremely near the final adjustment point based on variations in the sets and long time for the adjustment is necessary.

SUMMARY OF THE INVENTION

A first object of this invention is to provide a disk reproduction device capable of easily automatically adjusting the focus balance.

A second object of this invention is to provide a disk reproduction device capable of automatically adjusting the focus balance according to the use condition of a set.

A third object of this invention is to provide a disk reproduction device capable of preventing the deviation in the adjustment caused by deterioration of the pickup element and electric parts with time.

A fourth object of this invention is to provide a focus balance automatic adjustment device and automatic adjustment method capable of always controlling the focus servo system into an optimum state.

Further, a fifth object of this invention is to provide a signal processing device capable of always controlling the focus servo system into an optimum state.

The above first to third objects of this invention can be attained by a disk reproduction device comprising a pickup unit for optically reading information recorded on a disk; a servo control unit for controlling the focus position in the pickup unit; a control signal creation circuit for creating a first control signal used for controlling the focus position of the pickup unit based on the information read from the disk; a disturbance generator for generating a disturbance signal having first and second levels; an adder for adding the first control signal and the disturbance signal together and outputting the result of addition to the servo control unit; a level detection circuit for detecting a first amplitude level of an output signal from the pickup unit when the disturbance signal is set at the first level and detecting a second amplitude level of the output signal from the pickup unit when the disturbance signal is set at the second level; and a difference circuit for creating a second control signal corresponding to a difference between the first and second amplitude levels and outputting the second control signal to the control signal creation circuit; wherein the control signal creation circuit creates the first control signal in response to the second control signal.

The fourth object of this invention can be attained by a focus balance automatic adjusting device comprising a focus adjusting circuit for adjusting the focus position of a light beam in an optical pickup unit for reading information recorded on a disk by applying a light beam to the disk and receiving the reflected light; a focus control circuit for creating a control signal to control the focus adjusting circuit; a disturbance generator for generating a disturbance signal having first and second levels for deviating the focus position of the light beam in opposite directions; a level detection circuit for detecting levels of outputs of the optical pickup unit generated when the first and second levels of the disturbance signal are input; a level difference deriving circuit for deriving a difference between the output level of the optical pickup unit detected by the level detection circuit when the disturbance signal is set at the first level and the output level of the optical pickup unit detected when the disturbance signal is set at the second level; and a signal processing circuit for controlling the focus control circuit according to a level difference output from the level difference deriving circuit to set the output level of the optical pickup unit obtained when the disturbance signal is set at the first level and the output level of the optical pickup unit obtained when the disturbance signal is set at the second level equal to each other.

Further, the object of this invention can be attained by a focus balance automatic adjusting method comprising the steps of generating a disturbance signal of first level; supplying the disturbance signal of first level to an optical pickup unit to deviate the focus position of a light beam in a first direction; detecting a first amplitude level of an output signal of the optical pickup unit obtained when the disturbance signal of first level is input; generating a disturbance signal of second level; supplying the disturbance signal of second level to the optical pickup unit to deviate the focus position of the light beam in a second direction which is opposite to the first direction; detecting a second amplitude level of an output signal of the optical pickup unit obtained when the disturbance signal of second level is input; deriving a difference between the first and second amplitude levels; correcting the focus position of the light beam of the optical pickup unit according to the derived difference between the first and second amplitude levels; and determining that the light beam of the optical pickup unit is focused when the first and second amplitude levels are set equal to each other.

According to the above construction and method, the de-focus direction and deviation amount can be determined by introducing the disturbance signal of first and second levels to the focus servo system and forcedly and alternately de-focusing the light beam in the positive and negative directions. Therefore, the focus servo system can always be set in the optimum state by adequately effecting the focus balance adjustment at the time of operation of the system.

The fifth object of this invention is attained by a signal processing device comprising a control signal creation circuit for creating a first control signal used for controlling the focus position of an optical pickup unit for optically reading information recorded on a disk; a disturbance generator for generating a disturbance signal having first and second levels; an adder for adding the first control signal and the disturbance signal together and outputting the result of addition to a servo control unit for controlling the focus position of the pickup unit; a level detection circuit for detecting a first amplitude level of an output signal from the pickup unit when the disturbance signal is set at the first level and detecting a second amplitude level of the output signal from the pickup unit obtained when the disturbance signal is set at the second level; and a difference circuit for creating a second control signal corresponding to a difference between the first and second amplitude levels and outputting the second control signal to the control signal creation circuit; wherein the control signal creation circuit creates the first control signal in response to the second control signal.

With the above construction, the de-focus direction and deviation amount can be determined by introducing the disturbance signal of first and second levels into the focus servo system and forcedly and alternately defocusing the light beam in the positive and negative directions. Therefore, the focus servo system of the signal processing device can always be set in the optimum state by adequately effecting the focus balance adjustment at the time of operation of the system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a waveform diagram of various signals in the circuit shown in FIG. 3;

FIG. 8 is a circuit diagram showing another example of the construction of the focus balance automatic adjusting device in the disk reproducing device, for illustrating a second embodiment of this invention;

DETAILED DESCRIPTION OF THE PREFERRED EMBODIMENTS

Figure 1:
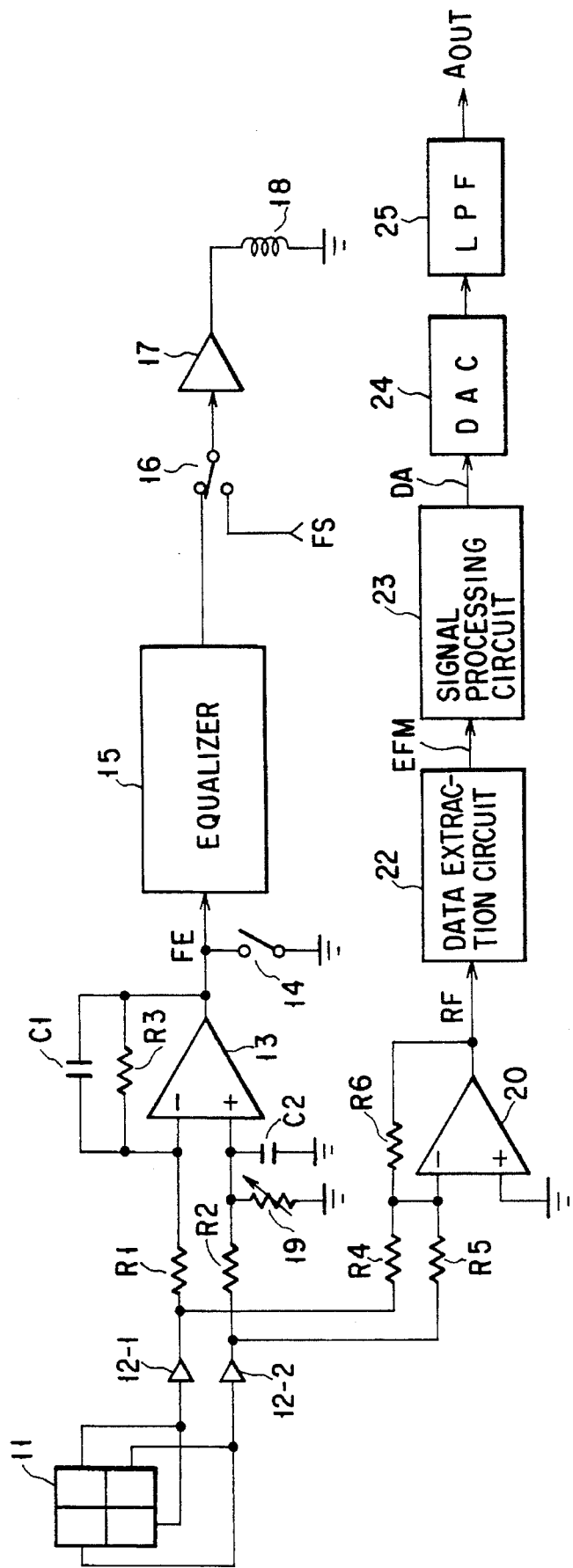
FIGS. 1 and 2 are circuit diagrams each showing an example of the construction of a focus balance adjusting circuit in the conventional disk reproducing device utilizing the astigmatism method.
Figure 2:
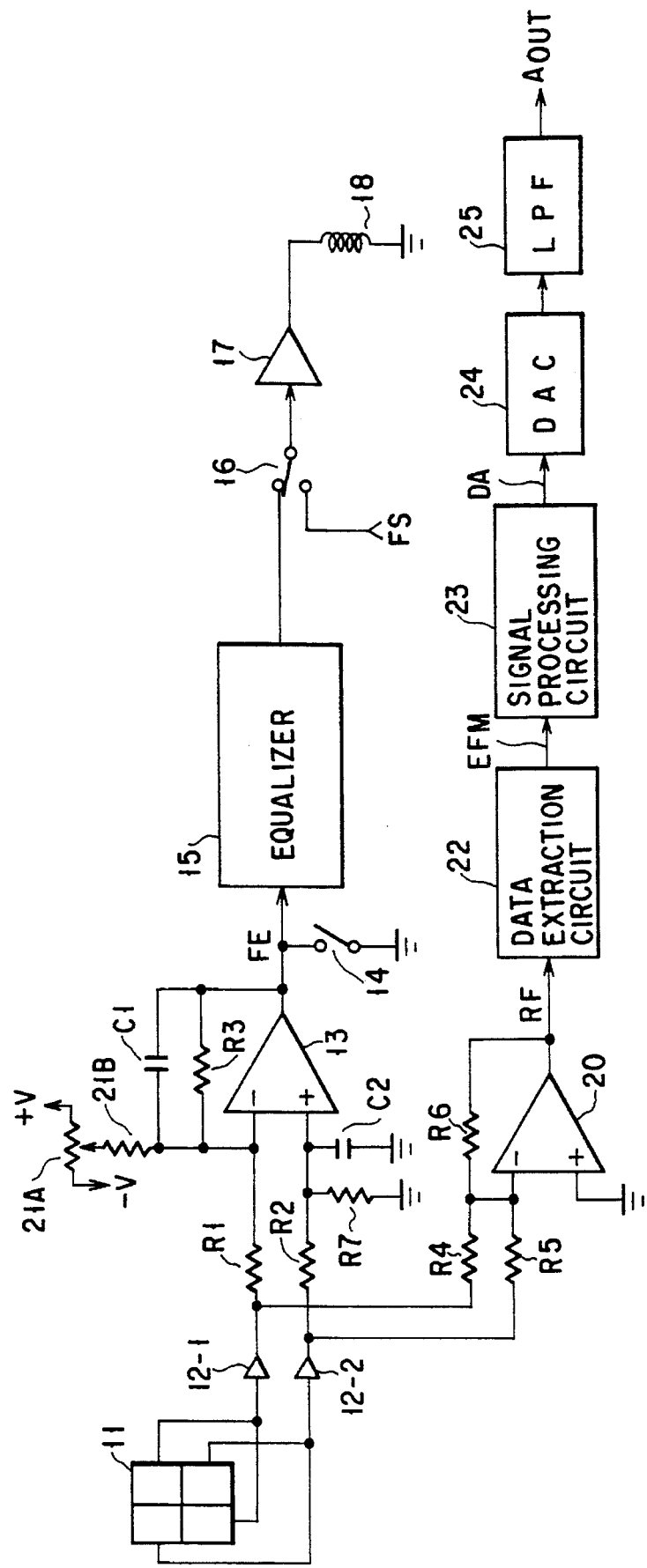
Figure 3:
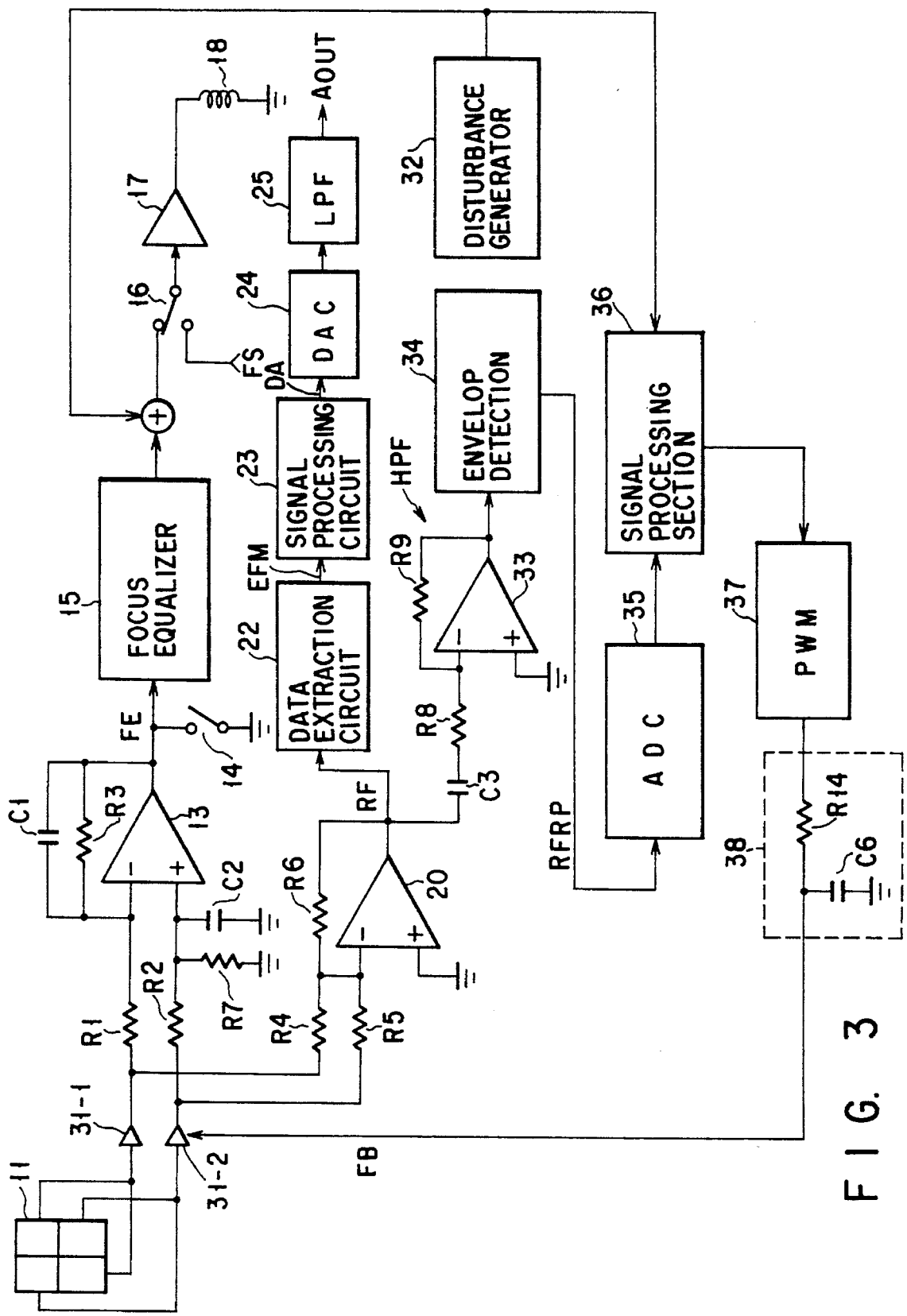
FIG. 3 is a circuit diagram for illustrating a focus balance automatic adjusting device and automatic adjusting method in a disk reproducing device according to a first embodiment of this invention.

FIG. 3 shows an example of the construction of a focus balance automatic adjusting device in a disk reproducing device according to a first embodiment of this invention. A four-divided detector 11 formed of photodiodes or the like is so designed that signals (currents) can be derived from four divided portions. Signal currents from the portions lying on the respective diagonal lines are added together and the results of addition are respectively supplied to current-voltage converters 31-1, 31-2 and to the inverting input terminal (−) and non-inverting input terminal (+) of a differential amplifier 13 via resistors R1, R2. The current-voltage converters 31-1, 31-2 convert the two added signal currents into voltages. The current-voltage converter 31-2 is designed such that the gain thereof can be converted and the gain thereof is controlled by a focus balance adjusting signal FB which will be described later. A parallel circuit of a resistor R3 and a capacitor C1 is connected between the inverting input terminal (−) and an output terminal of the differential amplifier 13. Further, a capacitor C2 and a resistor R7 is connected between the non-inverting input terminal (+) of the differential amplifier 13 and a ground terminal. An output of the differential amplifier 13 is supplied to a focus equalizer 15 as a focus error signal FE and the gain and phase thereof are compensated for by the equalizer 15. Whether the focus error signal FE is supplied to the equalizer 15 or not is controlled by use of a loop ON/OFF switch 14, when the switch 14 is set in the OFF state, the focus error signal FE is supplied to the equalizer 15, and when the switch 14 is set in the ON state, the potential of the input terminal of the equalizer 15 is set to the ground potential. A disturbance signal of stepped form (having first and second levels) created by a disturbance generator 32 is added to an output signal of the focus equalizer 15 and the result of addition is supplied to a selection switch 16. The selection switch 16 is switched to select the output signal of the equalizer 15 or a focus search signal FS and supplies a selected signal to a driver 17. Then, a focus actuator 18 is driven by the driver 17.

Output signals of the current-voltage converters 31-1 and 31-2 are supplied to the inverting input terminal (−) of a differential amplifier 20 via resistors R4 and R5, respectively. A resistor R6 is connected between the inverting input terminal (−) and an output terminal of the differential amplifier 20 and the non-inverting input terminal (+) thereof is connected to the ground terminal. With this connection, the differential amplifier 20 acts as an adder. A total sum signal of the four-divided detector 11 is derived by the adder, and as a result, an RF (radio frequency band) signal (which is also called an HF signal) which is information data is created.

The RF signal is binary-coded by a data extraction circuit 22 and supplied to a signal processing circuit 23 as an EFM signal. In the signal processing circuit 23, the EFM demodulation, sub-code demodulation, error correction processing and the like are effected and the results of the processings are supplied to a digital/analog converter (DAC) 24 as data DA. An output of the DAC 24 is supplied to a low-pass filter (LPF) 25 and the high frequency component thereof is cut off. Then, an output of the LPF 25 is output as a reproduced audio signal $A_{OUT}$.

Further, the RF signal is supplied to a high-pass filter (HPF) and the D.C. component thereof is cut off. The high-pass filter is constructed by a differential amplifier 33, resistors R8, R9 and capacitor C3. One electrode of the capacitor C3 is connected to the output terminal of the differential amplifier 20 and the other electrode thereof is connected to one end of the resistor R8. The other end of the resistor R8 is connected to an inverting input terminal (−) of the differential amplifier 33. The resistor R9 is connected between the inverting input terminal (−) and an output terminal of the differential amplifier 33 and the non-inverting input terminal (+) of the differential amplifier 33 is connected to a ground terminal. An output of the differential amplifier 33 is supplied to an envelop detector circuit (detector) 34 to effect the peak detection and bottom detection and a difference therebetween is supplied to an analog/digital converter (ADC) 35 as an RFRP signal. The RFRP signal is converted into digital data by the ADC 35 and the digital data is supplied to a signal processing section 36. The signal processing section 36 is also supplied with a disturbance signal from the disturbance generator 32, receives values of the RFRP signal (digital signal) obtained when the disturbance signal is positive and negative, and derives a difference between the values thereof.

An output of the signal processing section 36 is supplied to a pulse width modulation (PWM) circuit 37 to create a focus balance adjusting signal FB. The signal FB is supplied to the current-voltage converter 31-2 via a carrier rejection filter 38 formed of a resistor R14 and a capacitor C6 so as to control the gain.

Figure 4:
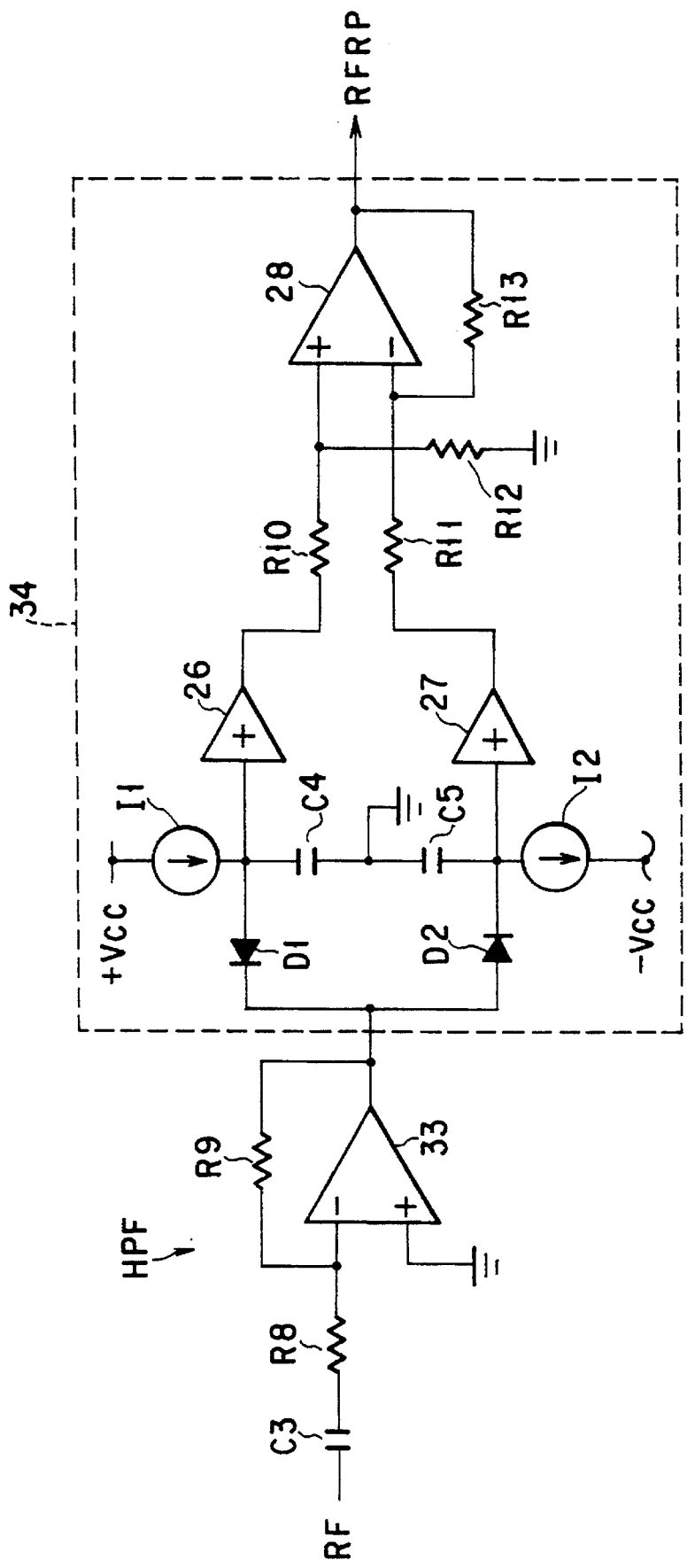
FIG. 4 is a circuit diagram showing an example of the detail construction of an envelop detector circuit in the circuit of FIG.

FIG. 4 shows an example of the detail construction of the envelop detection circuit 34. An RFRP signal is created based on the RF signal by the high-pass filter HPF and the envelop detection circuit 34. The envelop detection circuit 34 includes diodes D1, D2, current sources I1, I2, capacitors C4, C5, buffer amplifiers 26, 27, resistors R10 to R13, and differential amplifier 28. An output terminal of the differential amplifier 33 in the high-pass filter HPF is connected to the cathode of the diode D1 and the anode of the diode D2. The anode of the diode D1 is connected to an input terminal of the buffer amplifier 26 and the cathode of the diode D2 is connected to an input terminal of the buffer amplifier 27. The current source I1 is connected between the input terminal of the buffer amplifier 26 and the power source +vcc and the capacitor C4 is connected between the input terminal thereof and the ground terminal. The current source I2 is connected between the input terminal of the buffer amplifier 27 and the power source -vcc and the capacitor C5 is connected between the input terminal thereof and the ground terminal. An output terminal of the buffer amplifier 26 is connected to the non-inverting input terminal (+) of the differential amplifier 28 via a resistor R10, an output terminal of the buffer amplifier 27 is connected to one end of the resistor R11, and the other end of the resistor R11 is connected to the inverting input terminal (−) of the differential amplifier 28. A resistor R12 is connected between the non-inverting input terminal (+) of the differential amplifier 28 and the ground terminal and a resistor R13 is connected between the inverting input terminal (−) and an output terminal of the differential amplifier 28. An RFRP signal is derived from the output terminal of the differential amplifier 28.

In the envelop detection circuit 34 with the above construction, the value of a lower envelop of the RF signal is detected by means of the diode D1, current source I1, capacitor C4 and buffer amplifier 26 and the value of an upper envelop of the RF signal is detected by means of the diode D2, current source I2, capacitor C5 and buffer amplifier 27. An RFRP signal is created by deriving a difference between the above envelop values by use of the differential amplifier 28 and resistors R10 to R13.

Figure 5:
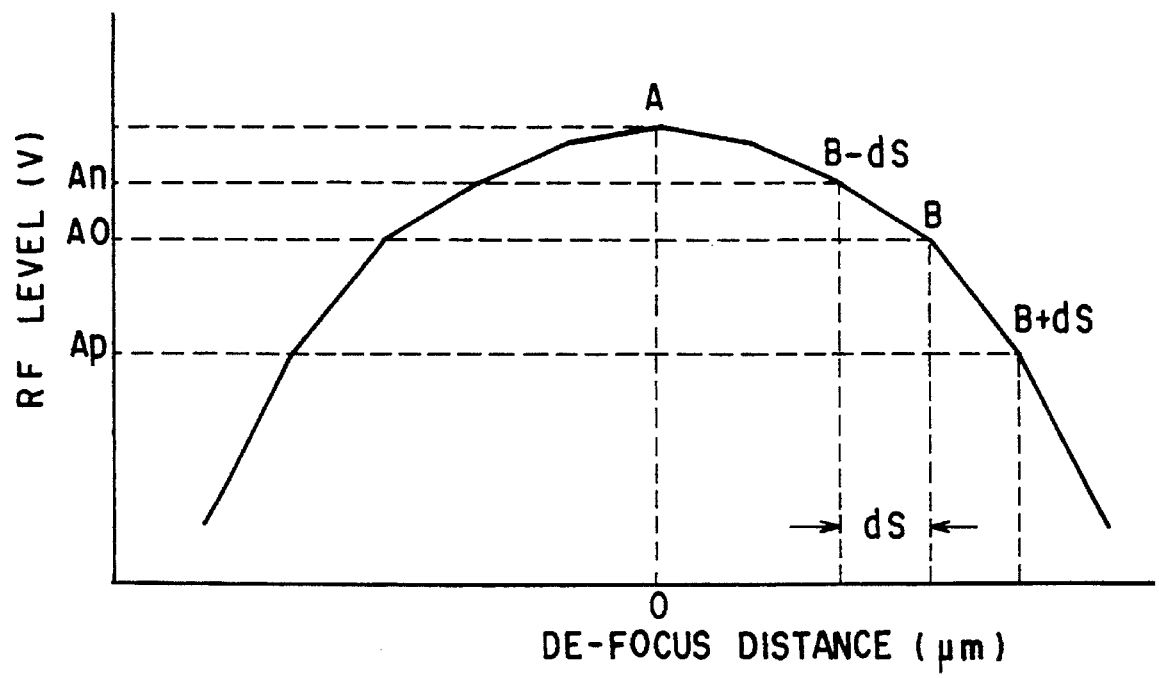
FIGS. 5 and 6 are diagrams each showing the relation between the de-focus distance and the level of an RF signal.
Figure 6:
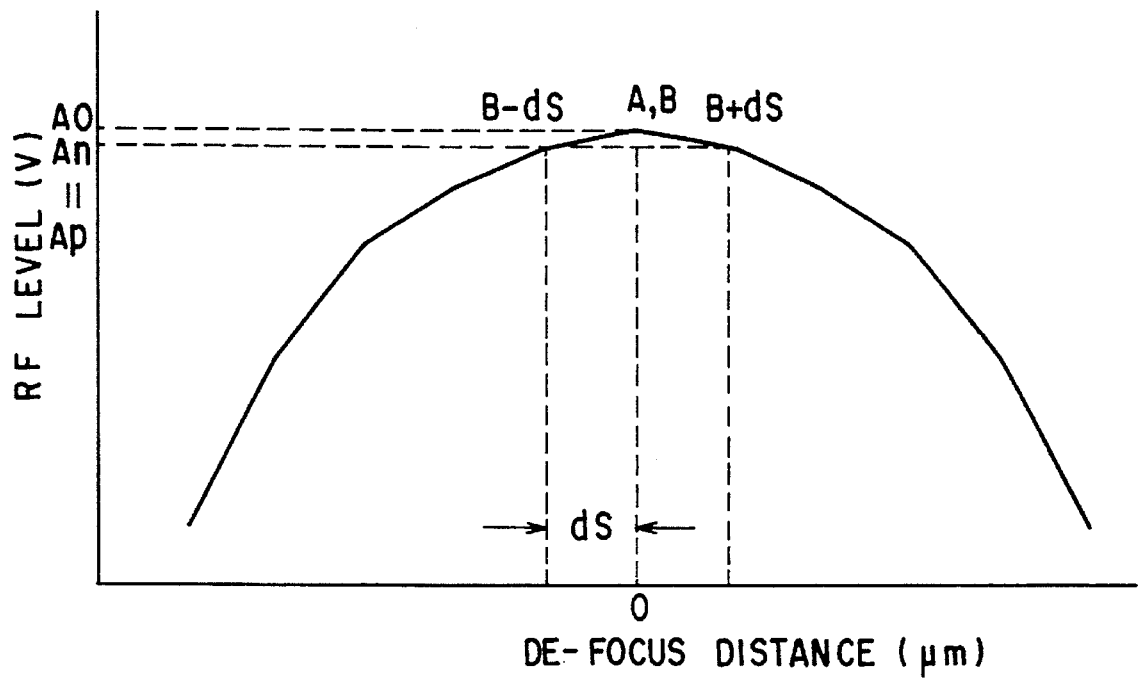

Next, the operation of the circuit shown in FIGS. 3 and 4 is explained in detail with reference to FIGS. 5 to 7. FIGS. 5 and 6 are diagrams each showing the relation between the de-focus amount and the amplitude of the RF signal. The de-focus amount of "0" indicates the position in which the focus position of the laser beam for the respective pickups is precisely set on the disk surface and the amplitude of the RF signal is set at the maximum level. If the focus position of the laser beam before adjustment is set at the point "B" of FIG. 5, the RF level (v) indicating the amplitude of the RF signal indicates a value of "A0". If, in this state, a disturbance signal as shown in FIG. 7 is applied, the focus position is de-focused ("B+ds" and "B−ds") by "ds" with the point "B" set at the center. At this time, the amplitude of the RF signal becomes "Ap" when the de-focus amount is "B+ds" and it becomes "An" when the de-focus amount is "B−ds". The levels of the RFRP signal corresponding to "Ap" and "An" of the RF signal are detected and the balance is adjusted to set the two levels equal to each other. The levels of the RFRP signal corresponding to "Ap" and "An" of the RF signal are set at "Apr" and "Anr" as shown in FIG. 7, and if the gain of the detector 34 is "Kdet", the relations of "Apr=Kdet.Ap" and "Anr=Kdet·An" are obtained. Further, by calculating "Apr−Ant", the de-focus direction can be determined based on the polarity of the result and whether the focus position should be set closer to or separated from the disk can be determined.

"Ap" and "An" indicate such levels as shown in FIG. 7 and the level "Vd" of the disturbance signal and the period "Td" are determined based on the gain distribution of the focus servo system and the pickup. If the driving sensitivity of the focus actuator 18 is K (μm/V), the gain of the driver 17 is Gd (times), and the open loop gain of the focus servo is HL, then the de-focus amount ds can be expressed as follows:

$$ds = K \cdot Gd \cdot Vd/(1+HL) \ (\mu m)$$

If the envelop of the RF signal is monitored in a state in which a disturbance signal which is a forced de-focus signal is introduced into the focus servo loop, the amplitude of the RF signal in the de-focus state becomes small. By using this characteristic, the operations of moving the focus position in a direction (positive) approaching the disk and in a direction (negative) departing from the disk are alternately effected and the gain of the first-stage current-voltage converter 31-2 is set to suppress the fluctuation in the amplitude of the RF signal at the respective times to a minimum as shown in FIG. 6.

In the above embodiment, an RFRP signal which is a difference signal between the upper envelop and the lower envelop of the RF signal having amplitude information of the RF signal is used as a monitor signal. The RFRP signal is subjected to the AD conversion, a difference ΔL between the peak level of the RFRP signal at the time of positive side de-focus and the peak level of the RFRP signal at the time of negative side de-focus is derived, and the gain of the current-voltage converter 31-2 is adjusted to set the difference ΔL to "0". In this adjustment, the tracking servo may be set in the ON or OFF state.

With the above construction, the focus balance adjustment which was conventionally effected by the operator by use of the semi-fixed resistor or the like can be automatically effected. Further, the percent defective caused by the mis-adjustment in the mass production line of sets can be suppressed. The adjustment for the service condition of the set can be made and the adjustment deviation by deterioration of the pickup and electric parts with time can be prevented. Further, by adequately effecting the focus balance adjustment at the time of system operation, for example, the focus servo system can be set in the optimum condition according to the environment in which it is used.

FIG. 8 illustrates a second embodiment of this invention and shows another example of the construction of the focus balance automatic adjustment device in the disk reproduction device. A four-divided detector 11 formed of photodiodes or the like is so designed that signals (currents) can be derived from four divided portions. Signals (currents) from the portions lying on each of the diagonal lines are added together and the results of addition are respectively supplied to current-voltage converters 12-1, 12-2 and to the inverting input terminal (−) and non-inverting input terminal (+) of a differential amplifier 39 via resistors R1, R2. The current-voltage converters 12-1, 12-2 each convert the two added signals (currents) into voltages. A parallel circuit of a resistor R3 and a capacitor C1 is connected between the inverting input terminal (−) and an output terminal of the differential amplifier 39. Further, a capacitor C2 and a resistor R7 are connected between the non-inverting input terminal (+) of the differential amplifier 39 and a ground terminal. The inverting input terminal (−) of the differential amplifier 39 is supplied with a focus balance adjustment signal FB output from a carrier rejection filter 38. As a result, a difference between the two signal currents output from the detector 11 can be derived by the differential amplifier 39 and difference signal is added to the focus balance adjustment signal FB to create a focus error signal FE. An output of the differential amplifier 39 is supplied to a focus equalizer 15 as a focus error signal FE and the gain and phase thereof are compensated for by the equalizer 15.

Since the other construction is the same as that of the circuit shown in FIG. 3, the same reference numerals are attached to the same portions and the detail explanation therefor is omitted.

In the circuit of FIG. 8, the focus balance adjustment signal FB is added to the difference value of the signal current derived by the differential amplifier 39 for creating the focus error signal FE and thus the focus error signal is derived and used to effect the focus balance adjustment. The focus balance automatic adjustment device shown in FIG. 8 is different from the circuit of FIG. 3 in that the focus balance adjustment signal FB is added to the difference signal output from the differential amplifier 39 to create the focus error signal FE, but the other basic operation and effect are the same.

Figure 9:
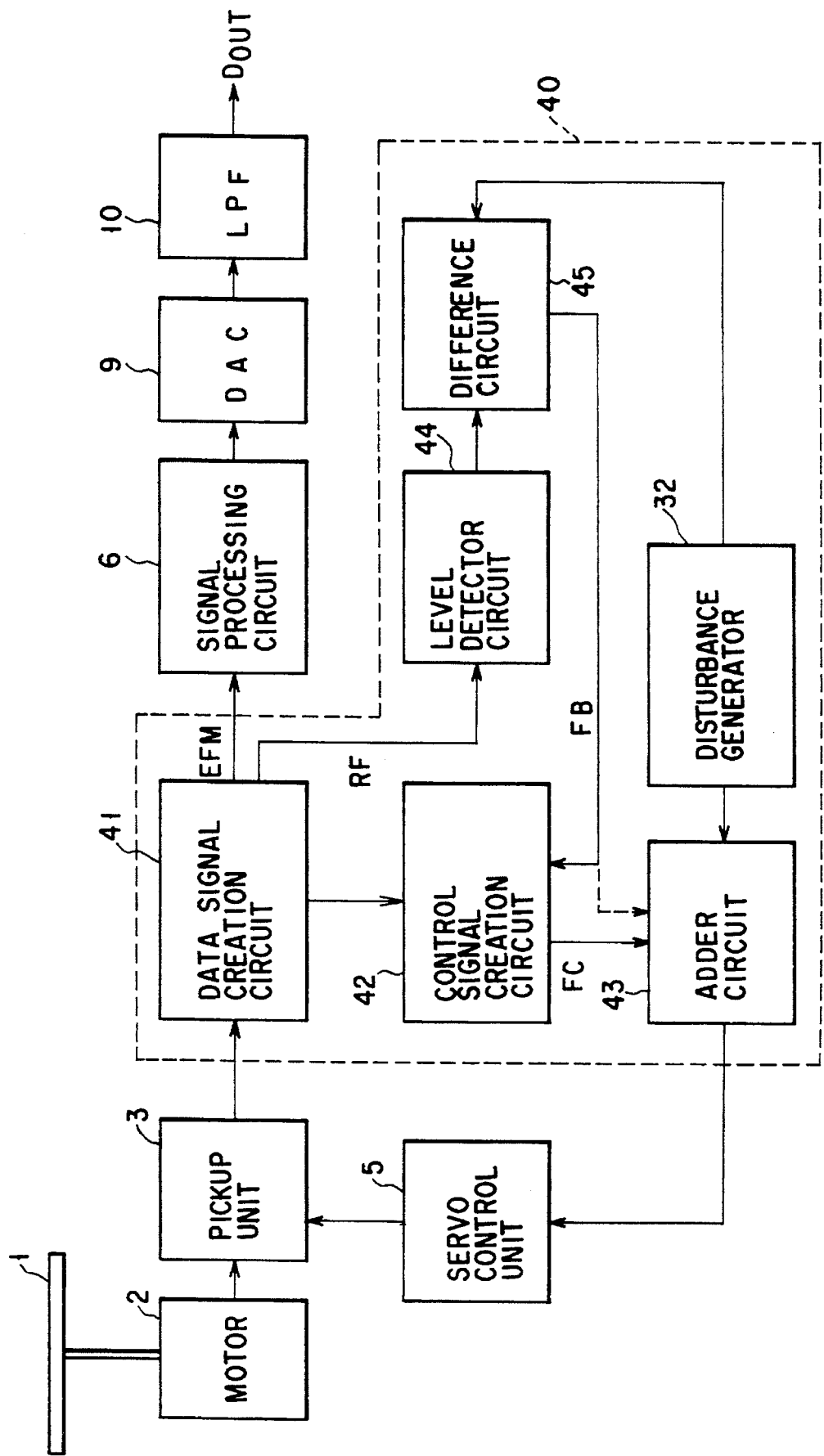
FIG. 9 is a block diagram showing the schematic construction of a signal processing device having a focus balance automatic adjusting device and a peripheral unit thereof, for illustrating a third embodiment of this invention.

FIG. 9 is a block diagram for illustrating a third embodiment of this invention and showing the schematic construction of a signal processing device having a focus balance automatic adjustment device and the peripheral unit thereof. The signal processing device 40 includes a data signal creation circuit 41, control signal creation circuit 42, adder circuit 43, level detection circuit 44, difference circuit 45 and disturbance generator 32. The data signal creation circuit 41 includes an adder constructed by the differential amplifier 20 and the resistors R4 to R6, and the current-voltage converters 31-1, 31-2 (or 12-1, 12-2) in the circuit shown in FIGS. 3 and 4. The control signal creation circuit 42 includes the differential amplifier 13 (or 39), resistors R1 to R3, R7, capacitors C1, C2, loop ON/OFF switch 14 and focus equalizer 15. The level detection circuit 44 includes the high-pass filter HPF and envelop detector circuit 34. The difference circuit 45 includes the ADC 35, signal processing section 36, PWM 37 and carrier rejection filter 38.

The disk 1 having information recorded thereon is rotated by the motor 2. A laser beam which is generated from the semiconductor laser provided in the optical pickup unit 3 is applied to the disk 1, the reflected light is received by the four-divided detector in the unit 3, and current signals are derived from the four divided portions thereof. The current signals from the portions lying on each of the diagonal lines are added together. Two signals obtained by the addition are supplied to a data signal creation circuit 41. After the two signals supplied to the data signal creation circuit 41 are converted into voltages by the current-voltage converter, they are added together to create an RF signal, binary-coded and then supplied to a signal processing circuit 6 as an EFM signal. In the signal processing circuit 6, the EFM demodulation, sub-code demodulation, error correction process and the like are effected and an output thereof is supplied to a digital/analog converter (DAC) 9. An analog signal output from the DAC 9 is supplied to a low-pass filter (LPF) 10 and the high frequency component thereof is eliminated. A reproduction signal $D_{OUT}$ of data recorded on the disk 1 is output from the LPF 10.

A signal supplied from the data signal creation circuit 41 to the control signal creation circuit 42 is added to a focus balance adjusting signal FB output from the difference circuit 45 to create a focus control signal FC (which is the same as the focus error FE of FIGS. 3 and 8) as a first control signal. The focus control signal FC is added to a disturbance signal having a first and second levels created by the disturbance generator 32 by the adder circuit 43 and the result of addition is supplied to the focus servo control circuit in the servo control unit 5. The focus servo control circuit drives the focus actuator in the pickup unit 3 to correct the focus position of the beam spot.

Further, a data signal (RF signal) created in the data signal creation circuit 41 is supplied to the level detection circuit 44. The first amplitude level of the data signal is detected according to the first level of the disturbance signal generated from the disturbance generator 32 by the circuit 44 and the second amplitude level of the data signal is detected according to the second level of the disturbance signal. An output of the level detection circuit 44 is supplied to the difference circuit 45 and a second control signal FB corresponding to a difference between the first and second amplitude levels of the data signal is created by the circuit 45. The second control signal FB is supplied to the control signal creation circuit 42 and a focus control signal FC is created according to the control signal FB by the circuit 42.

The second control signal FB may be additionally supplied to the adder circuit 43 as indicated by broken lines in addition to the sum of the signal FC created by the control signal creation circuit 42 and the disturbance signal.

Figure 10:
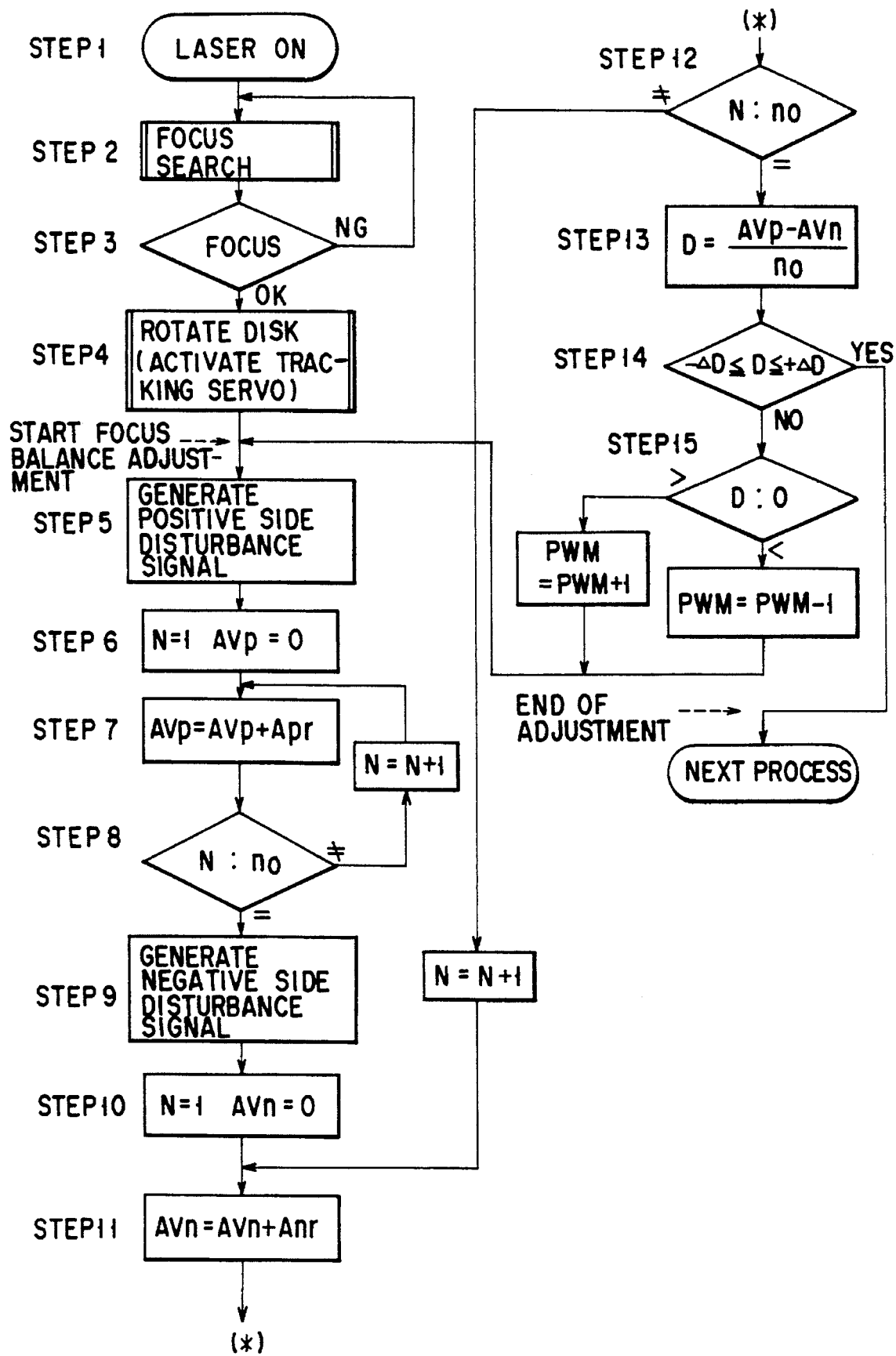
FIG. 10 is a flowchart for illustrating a focus balance automatic adjusting method in the circuit shown in FIG. 9.

FIG. 10 is a flowchart for illustrating the focus balance adjustment method effected by use of the control signal creation circuit 42, difference circuit 45, disturbance generator 32 and adder circuit 43 of the signal processing circuit shown in FIG. 9. First, after the laser is turned ON (STEP 1), the operation called the focus search is effected (STEP 2), the focus actuator is forcedly driven to a position near the focus position and the focus servo is closed. After this, whether the fOCUS servo is operated or not is determined (STEP 3) by monitoring the RF signal. If it is detected that the focus servo is operated, the disk 1 is rotated by the motor 2 (and the tracking servo is activated) to start the focus balance automatic adjustment (STEP 4).

A positive disturbance signal is generated from the disturbance generator 32 (STEP 5) and supplied to the servo circuit. Then, an averaged number N is set to "1" and a register AVp used for calculating the average value is set to "0" (STEP 6). Next, Apr data is fetched and added to data of the register AVp (STEP 7). Then, whether the fetched sample number N is set to a value $n_0$ or not is checked (STEP 8), and if it is detected that the number is not set to $n_0$, Apr data is repeatedly fetched.

When it is determined that the accumulated sample number has exceeded $n_0$, the disturbance signal is changed to the negative side (STEP 9), the averaged number N is set to "1", and a register AVn used for calculating the average number is initialized to "0" (STEP 10).

After this, Anr data items of $n_0$ are accumulatively added in the same manner as in the case of positive value (STEP 11, 12). After fetching Ant data items of $n_0$, (Apr/Anr)/$n_0$ is calculated and a difference value D of the average level of RFRP signals for each sample is calculated (STEP 13). Then, whether the difference value D lies in the range of the window from "$-\Delta D$" to "$+\Delta D$" or not is determined (STEP 14). The windows "$-\Delta D$" and "$+\Delta D$" are minute values near "0" and "$\Delta D$" are called the adjustment precision.

If the difference value D is not in the above range, the control signal output from the PWM is subjected to the up/down control by one step at a time according to the sign of the value D.

After this, the step (STEP 5) of generating the positive disturbance signal is effected again and the same process is repeatedly effected until the value D comes into the range of the window between "$-\Delta D$" and "$+\Delta D$".

The focus balance automatic adjustment operation is effected as described above, and after the completion of the process, the next process including data fetch is effected.

As described above, with the focus balance automatic adjustment device in the disk reproducing device of this invention, since the positive and negative de-focus positions are formed according to a disturbance signal output from the disturbance generator and a difference between them is calculated each time the central position thereof is moved, time required for the adjustment becomes shorter as the initial condition is nearer to the final adjustment point and thus the adjustment time can be reduced. When the adjustment is started by the disturbance signal from the disturbance generator 32, the position in which the focus position is set on the parabolic curve of the de-focus characteristic can be determined. Therefore, by de-focusing the focus position by a minute amount in the positive direction and negative direction from the above position, the direction towards the adjustment point can be determined according to whether the two difference values are positive or negative. Further, since only determination whether a difference value between RF signals fetched in the two de-focus conditions is "0" or not is made, the circuit construction can be made simple and the processing time can be reduced.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk reproduction device comprising:

pickup means for optically reading information recorded on a disk;

servo control means for controlling the focus position in said pickup means;

control signal creation means for creating a first control signal used for controlling a focus position of said pickup means based on the information read from said disk, said control signal creation means having a loop ON/OFF switch for closing and opening a focus servo loop;

disturbance signal generation means for generating a disturbance signal having first and second levels;

adder means for adding the first control signal and the disturbance signal together and outputting the result of addition to said servo control means;

level detection means for detecting, in response to said disturbance signal generated in said disturbance signal generation means, first and second amplitude levels of a data signal read from said disk by said pickup means, said level detection means being supplied with the disturbance signal while said focus servo loop is kept closed by turning on said loop ON/OF switch, said level detection mean detecting the first amplitude level of the data signal when the disturbance signal is set at the first level and detecting a second amplitude level of the data signal when the disturbance signal is set at the second level; and difference signal creation means for creating a second control signal corresponding to a difference between the first and second amplitude levels and outputting the second control signal to said control signal creation means;

wherein said control signal creation means creates the first control signal in response to the second control signal.

2. A disk reproduction device according to claim 1, wherein said disturbance signal controls movement of the focus position of said pickup means such that when said disturbance signal is at said first level, the focus position is moved in a first direction by a certain distance and when said disturbance signal is at said second level, the focus position is moved in a second direction opposite to said first direction by said certain distance.

3. A disk reproduction device comprising:

pickup means for optically reading information recorded on a disk;

servo control means for controlling the focus position in said pickup means;

control signal creation means for creating a first control signal used for controlling a focus position of said pickup means based on the information read from said disk, said control signal creation means having a loop ON/OFF switch for closing and opening a focus servo loop;

disturbance signal generation means for generating a disturbance signal having first and second levels;

level detection means for detecting, in response to said disturbance signal generated in said disturbance signal generation means, first and second amplitude levels of a data signal read from said disk by said pickup means, said level detection means being supplied with the disturbance signal while said focus servo loop is kept closed by turning on said loop ON/OF switch, said level detection mean detecting the first amplitude level of the data signal when the disturbance signal is set at the first level and detecting a second amplitude level of the data signal when the disturbance signal is set at the second level;

difference signal creation means for creating a second control signal corresponding to a difference between the first and second amplitude levels and outputting the second control signal to said control signal creation means;

adder means for adding the first control signal, the disturbance signal and the second control signal together and outputting the result of addition to said servo control means.

4. A disk reproduction device according to claim 3, wherein said disturbance signal controls movement of the focus position of said pickup means such that when said disturbance signal is at said first level, the focus position is moved in a first direction by a certain distance and when said disturbance signal is at said second level, the focus position is moved in a second direction opposite to said first direction by said certain distance.

5. A focus balance automatic adjusting device comprising:

focus adjusting means for adjusting a focus position of a light beam in an optical pickup unit for reading information recorded on a disk by applying the light beam to the disk and receiving the reflected light, said focus adjusting means having a loop ON/OFF switch for closing and opening a focus servo loop;

focus control means for creating a control signal to control said focus adjusting means;

disturbance signal generator means for generating a disturbance signal having first and second levels for moving the focus position of the light beam in opposite directions;

level detection means for detecting, in response to the disturbance signal generated in said disturbance signal generation means, levels of output of said optical pickup unit generated when the first and second levels of the disturbance signal are input, said level detection means being supplied with said disturbance signal while said focus servo loop is kept closed by turning on said loop ON/OFF switch, said detection means detecting a first amplitude level output from said optical pickup unit when the disturbance signal is set at the first level and detecting a second amplitude level output from said optical pickup unit when the disturbance signal is set at the second level;

level difference deriving means for deriving a difference between the first amplitude level and the second amplitude level, by subtracting the output level of said optical pickup unit when the disturbance signal is set at the first level from the output level of said optical pickup unit when the disturbance signal is set at the second level; and signal processing means for controlling said focus control means according to a level difference output from said level difference deriving means to set the output level of said optical pickup unit obtained when the disturbance signal is set at the first level and the output level of said optical pickup unit obtained when the disturbance signal is set at the second level equal to each other.

6. A focus balance automatic adjusting device according to claim 5, wherein said disturbance signal controls movement of the focus position of the light beam such that when said disturbance signal is at said first level, the focus position is moved in a first direction by a certain distance and when said disturbance signal is st said second level, the focus position is moved in a second direction opposite to said first direction by said certain distance.

7. A focus balance automatic adjusting device according to claim 6, wherein said optical pickup unit includes a four-divided detector.

8. A focus balance automatic adjusting device according to claim 7, wherein said level detection means includes an adder for deriving the total sum signal of said four-divided detector and outputting an RF signal which is information data.

9. A focus balance automatic adjusting device according to claim 8, wherein said level difference deriving means includes a high-pass filter for cutting off the D.C. component from an output of said adder, and an envelop detector circuit for effecting the peak detection and bottom detection for an output signal of said high-pass filter and deriving a difference therebetween to create an RFRP signal.

10. A focus balance automatic adjusting device according to claim 9, wherein said signal processing means includes an analog/digital converter for converting the RFRP signal into digital signal, and a signal processing circuit for receiving values of the RFRP signal output from said analog/digital converter when the disturbance signal is set on the positive side and on the negative side and deriving a difference between the received values.

11. A focus balance automatic adjusting device according to claim 10, wherein said focus control means includes a pulse width modulation circuit for subjecting an output of said signal processing section to the pulse width modulation to create a focus balance adjustment signal.

12. A focus balance automatic adjusting device according to claim 11, wherein said focus control means further comprising a carrier elimination filter for receiving a focus balance adjustment signal output from said pulse width modulation circuit to create a signal used for controlling the gain of said second current-voltage converter.

13. A focus balance automatic adjusting device according to claim 7, wherein said focus adjusting means includes a first current-voltage converter supplied with the result of addition of signal currents derived from portions lying on one of the diagonal lines of said four-divided detector; a second current-voltage converter supplied with the result of addition of signal currents derived from portions lying on the other diagonal line of said four-divided detector; a differential amplifier supplied with output signals from said first and second current-voltage converters to derive a difference value between the signal currents and adding the difference value to an output signal of said focus control means to create a focus error signal; a focus equalizer for receiving the focus error signal to compensate for the gain and phase; adder means for adding together an output signal from said focus equalizer and the disturbance signal created by said disturbance signal generating means; and a driver for driving a focus actuator according to an output signal of said adder means.

14. A focus balance automatic adjusting device according to claim 13, further comprising a loop ON/OFF switch for controlling whether the focus error signal is supplied to said focus equalizer or not.

15. A focus balance automatic adjusting device according to claim 13, further comprising a selection switch for selectively supplying one of an output signal of said adder means and a focus search signal to said driver.

16. A focus balance automatic adjusting device according to claim 7, wherein said focus adjusting means includes a first current-voltage converter supplied with the result of addition of signal currents derived from portions lying on one of the diagonal lines of said four-divided detector; a second current-voltage converter supplied with the result of addition of signal currents derived from portions lying on the other diagonal line of said four-divided detector and having a gain controlled by an output signal of said focus control means; a differential amplifier supplied with output signals from said first and second current-voltage converters to create a focus error signal; a focus equalizer for receiving the focus error signal to compensate for the gain and phase; adder means for adding together an output signal from said focus equalizer and the disturbance signal created by said disturbance signal generating means; and a driver for for driving a focus actuator according to an output signal of said adder means.

17. A focus balance automatic adjusting device, according to claim 16, wherein said loop ON/OFF switch controls whether or not the focus error signal is supplied to said focus equalizer.

18. A focus balance automatic adjusting device according to claim 16, further comprising a selection switch for selectively supplying one of an output signal of said adder means and a focus search signal to said driver.

19. A focus balance automatic adjusting method comprising the steps of:

generating a disturbance signal of first level;

supplying the disturbance signal of first level to an optical pickup unit to move the focus position of a light beam in a first direction;

detecting, in response to said disturbance signal of said first level, a first amplitude level of an output signal of the optical pickup unit, said amplitude level of the output signal being obtained when the disturbance signal of said level is input and corresponding to a case where a focus position is moved in a first direction;

generating a disturbance signal of second level;

supplying the disturbance signal of second level to the optical pickup unit to move the focus position of the light beam in a second direction which is opposite to the first direction;

detecting, in response to said disturbance signal of said second level, a second amplitude level of an output signal of the optical pickup unit, said second amplitude level of the output signal being obtained when the disturbance signal of said second level is input and corresponding to a case where a focus position is deviated in a second direction;

deriving a difference between the first and second amplitude levels by subtracting the second amplitude level from the first amplitude level;

correcting the focus position of the light beam of the optical pickup unit according to the derived difference between the first and second amplitude levels; and determining that the light beam of the optical pickup unit is focused when the first and second amplitude levels are set equal to each other.

20. A focus balance automatic adjusting method according to claim 19, wherein said disturbance signal controls movement of the focus position of the light beam of said optical pickup unit such that when said disturbance signal is at said first level, the focus position is moved in a first direction by a certain distance and when said disturbance signal is at said second level, the focus position is moved in a second direction opposite to said first direction by said certain distance.

21. A signal processing device comprising: control signal creation means for creating a first control signal used for controlling a focus position of an optical pickup unit for optically reading information recorded on a disk, said control signal creation means having a loop ON/OFF switch for closing and opening a focus servo loop;

disturbance signal generation means for generating a disturbance signal having first and second levels;

adder means for adding the first control signal and the disturbance signal together and outputting the result of addition to a servo control means;

level detection means for detecting, in response to said disturbance signal generated in said disturbance signal generation means, first and second amplitude levels of a data signal read from said disk by said pickup means, said level detection means being supplied with the disturbance signal while said focus servo loop is kept closed by turning on said loop ON/OF switch, said level detection mean detecting the first amplitude level of the data signal when the disturbance signal is set at the first level and detecting a second amplitude level of the data signal when the disturbance signal is set at the second level; and difference signal creation means for creating a second control signal corresponding to a difference between the first and second amplitude levels and outputting the second control signal to said control signal creation means;

wherein said control signal creation means creates the first control signal in response to the second control signal.

22. A signal processing device according to claim 21, wherein said disturbance signal controls movement of the focus position of said optical pickup unit such that when said disturbance signal is at said first level, the focus position is moved in a first direction by a certain distance and when said disturbance signal is at said second level, the focus position is moved in a second direction opposite to said first direction by said certain distance.

23. A signal processing device comprising: control signal creation means for creating a first control signal used for controlling a focus position of an optical pickup unit for optically reading information recorded on a disk, said control signal creation means having a loop ON/OFF switch for closing and opening a focus servo loop;

disturbance signal generation means for generating a disturbance signal having first and second levels;

level detection means for detecting, in response to said disturbance signal generated in said disturbance signal generation means, first and second amplitude levels of a data signal read from said disk by said pickup means, said level detection means being supplied with the disturbance signal while said focus servo loop is kept closed by turning on said loop ON/OF switch, said level detection mean detecting the first amplitude level of the data signal when the disturbance signal is set at the first level and detecting a second amplitude level of the data signal when the disturbance signal is set at the second level;

difference signal creation means for creating a second control signal corresponding to a difference between the first and second amplitude levels and outputting the second control signal to said control signal creation means; and adder means for adding the first control signal, the disturbance signal and the second control signal together and outputting the result of addition to servo control means for controlling the focus position of said pickup unit.

24. A signal processing device according to claim 23, wherein said disturbance signal controls movement of the focus position of the light beam of said optical pickup unit such that when said disturbance signal is at said first level, the focus position is moved in a first direction by a certain distance and when said disturbance signal is at said second level, the focus position is moved in a second direction opposite to said first direction by said certain distance.

25. A focus balance automatic adjusting device comprising:

a focus adjusting circuit for adjusting a focus position of a light beam in an optical pickup unit for reading information recorded on a disk by applying a light beam to the disk and receiving the reflected light, said focus adjusting circuit having a loop ON/OFF switch for closing and opening a focus servo loop;

a focus control circuit for creating a control signal to control said focus adjusting circuit;

a disturbance signal generator for generating a disturbance signal having first and second levels for moving the focus position of the light beam in opposite directions;

a level detector circuit for detecting levels of outputs of said optical pickup unit generated when the first and second levels of the disturbance signal are input, in response to the disturbance signal generated in said disturbance signal generators, said level detector circuit being supplied with the disturbance signal while said focus servo loop is kept closed by turning on said loop ON/OF switch, said level detector circuit detecting a first amplitude level of the data signal when the disturbing signal is set at the first level and detecting a second amplitude level of the data signal when said disturbing signal is set at the second level;

a difference circuit for deriving a difference between the first amplitude level and the second amplitude level, by subtracting the output level of said optical pickup unit detected by said level detector circuit when the disturbance signal is set at the first level and the output level of said optical pickup unit detected when the disturbance signal is set at the second level; and signal processing circuit for controlling said focus control circuit according to a level difference output from said difference circuit to set the output level of said pickup unit obtained when the disturbance signal is set at the first level and the output level of said optical pickup unit obtained when the disturbance signal is set at the second level equal to each other.

26. A focus balance automatic adjusting device according to claim 25, wherein said disturbance signal controls movement of the focus position of the light beam of said optical pickup unit such that when said disturbance signal is at said first level, the focus position is moved in a first direction by a certain distance and when said disturbance signal is at said second level, the focus position is moved in a second direction opposite to said first direction by said certain distance.

\* \* \* \* \*